United States Patent [19]

Fallwell, Jr. et al.

[11] Patent Number: 4,575,847
[45] Date of Patent: Mar. 11, 1986

[54] HOT CARRIER DETECTION

[75] Inventors: Beeman N. Fallwell, Jr., Boca Raton; Matt A. Kaltenbach, Delray Beach; William B. Ott, Lake Worth, all of Fla.

[73] Assignee: International Business Machines Corp., Armonk, N.Y.

[21] Appl. No.: 536,027

[22] Filed: Sep. 26, 1983

[51] Int. Cl.⁴ .................. H04L 1/14; H04B 17/00
[52] U.S. Cl. .................... 371/57; 340/825.16; 340/825.5; 371/22; 371/24
[58] Field of Search .............. 371/22, 24, 57; 340/825.16, 825.17, 825.5; 370/85

[56] References Cited

U.S. PATENT DOCUMENTS

| | | | |
|---|---|---|---|
| 4,022,988 | 5/1977 | Lentz et al. | 371/22 X |
| 4,345,250 | 8/1982 | Jacobsthal | 340/825.5 |
| 4,498,716 | 2/1985 | Ward | 371/22 X |
| 4,514,845 | 4/1985 | Starr | 371/22 X |

Primary Examiner—Charles E. Atkinson
Attorney, Agent, or Firm—Robert Lieber

[57] ABSTRACT

In a local area network for data communications, stations which distributively control their access to a common bus or other medium are able to identify the location of any "hot" station transmitter (one stuck continuously in an "on" condition which cannot be isolated from the medium). Such networks are effectively disabled by a hot carrier, since each station conditions its access on sensing the medium as previously idle. The present "loop test" method permits all stations in the network to quickly establish the location of a hot transmitter, and thereby quickly direct field repair personnel to that location. It also permits operators to take action to physically disconnect the faulty transmitter from the medium, so that the other stations may continue to use the network until the fault is repaired.

13 Claims, 8 Drawing Figures

START FLAG
DEST. ADDRESS
ORIGIN ADDRESS
CONTROL
SEQUENCE
BYTE COUNT
HEADER CRC
DATA
DATA CRC
END FLAG

FIG. 5  BROADCAST 22

* - SAME AS FIG. 3, BUT WITH O=D
C INDICATING LOOP TEST & NO
DATA FIELD

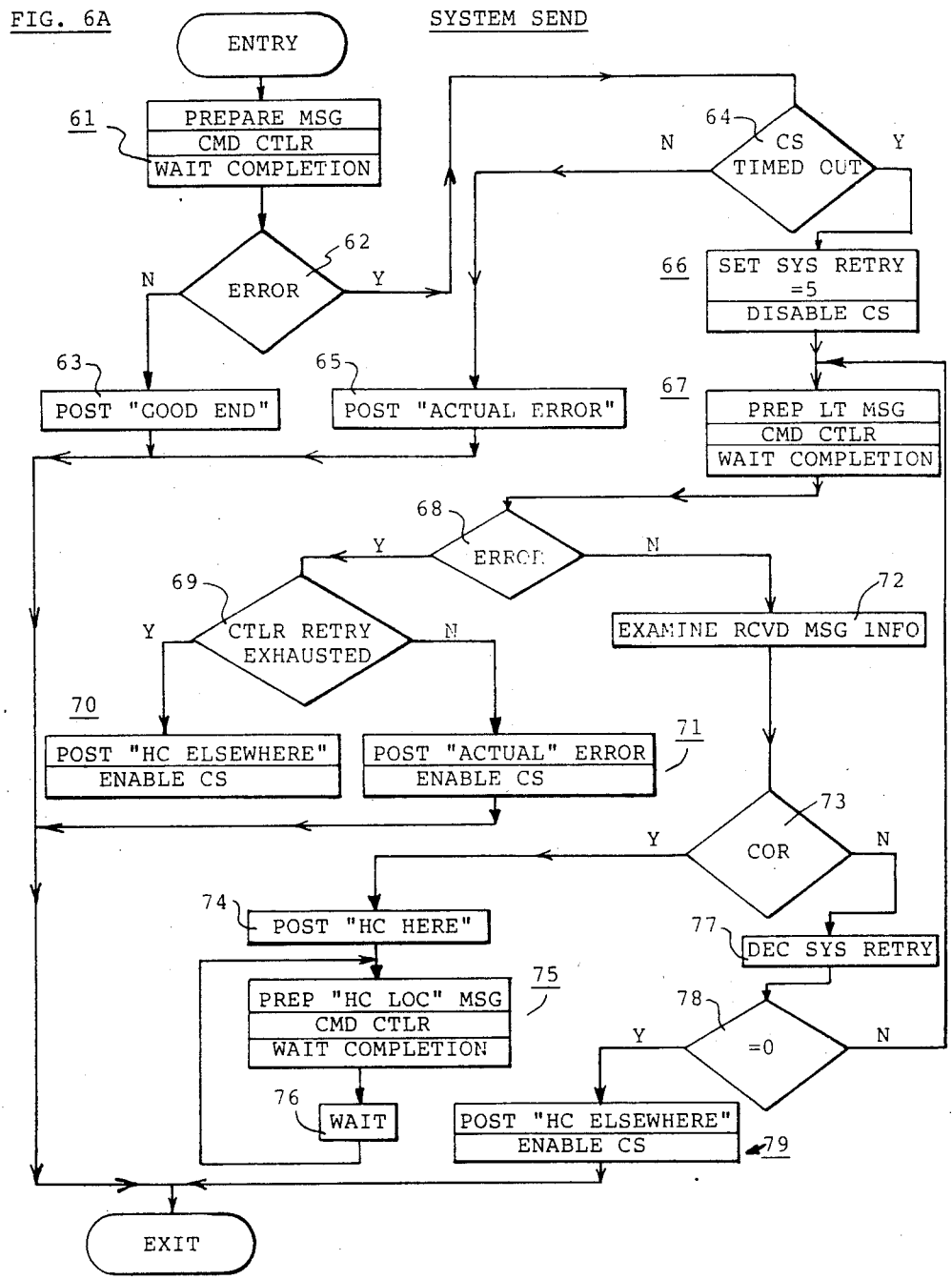

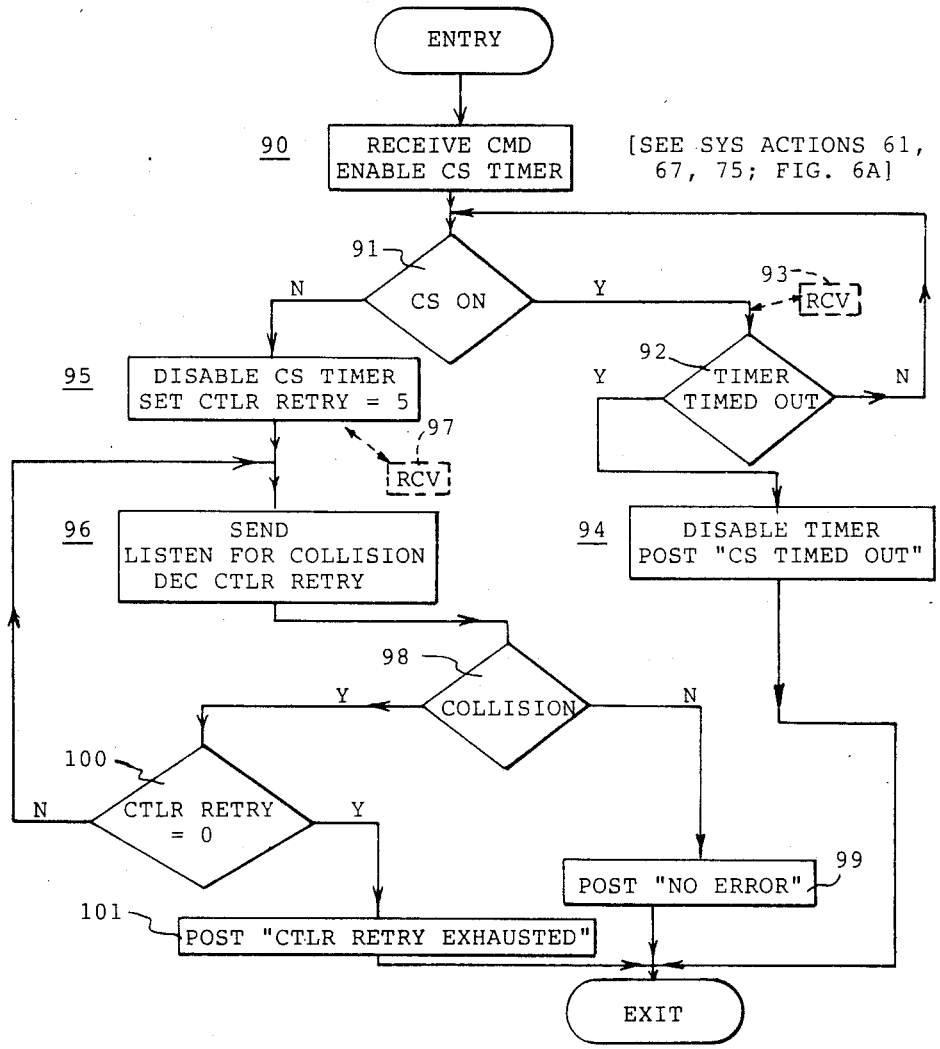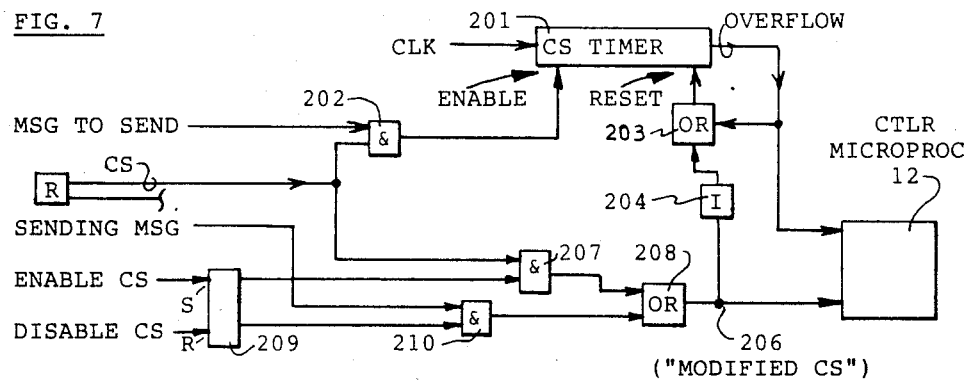

HOT CARRIER DETECTION

BACKGROUND OF THE INVENTION AND PRIOR ART

This invention relates to a method for automatically determining the location of a "hot carrier" in a multiple access data communication system. A hot carrier condition exists when a station's transmitter is stuck in a transmitting condition which can not be isolated from the common communication medium or channel without human intervention. The ability to have the stations automatically identify the location of the stuck transmitter is useful in at least two respects. It allows operating personnel to quickly locate and manually disconnect the faulty transmitter, so that the other stations may continue to use the medium, and it enables field repair personnel to quickly locate and repair the fault.

The invention can be implemented at very little cost in local area data communication networks which use carrier sense multiple access protocols with collision detection. Such systems, commonly termed CSMA/CD systems, are described in U.S. Pat. Nos. 4,063,220, granted to Metcalfe et al on Dec. 13, 1977, and 4,210,780 granted to Hopkins et al on July 1, 1980. In these systems the stations condition their access to a common medium or channel on sensing an idle signal condition on the medium. While transmitting, the stations keep their receiving circuits active and listen to the signals returning from the medium for detecting collisions (interfering transmissions by other stations). The facilities enabling the stations to listen while transmitting can be advantageously shared for performing the present "hot carrier detection" operation.

U.S. Pat. No. 3,825,897 describes a scheme for enabling stations in a system adapted particularly for the communication of alarm events (e.g. tripped burglar alarms), from outlying stations to a central monitoring facility, to continue to communicate such events when one of the stations has a "runaway transmitter". The stations do not assist in locating the fault. If the line is continuously busy, a station having an event to transmit operates after a timeout to override its line lockout circuitry and transmit its signal (in potential interference with the signal being emitted from the stuck transmitter). In this system, alarm event signals are represented by discrete pulses with long time separations. Thus, it is possible for the signal sent by an overriding station to be recognized at the central station, particularly if it is sent repeatedly. This would not have application to contemporary systems in which the data pulses are very closely spaced in time.

SUMMARY OF THE INVENTION

The present invention fulfills the need identified above for unambiguously locating hot transmitter conditions in today's high speed data communication networks. We provide a method for quickly determining the location of a hot transmitter and provide an indication thereof both at the site of the fault and at neighboring stations, so that operating personnel and field repair personnel closest to the fault site may be quickly directed to disconnect and repair the faulty transmitter.

The present invention employs a loop test scheme in which stations sensing a busy condition on the common bus medium operate after a timeout interval of predetermined duration to attempt to send a test message of predetermined form while maintaining receptive linkage to the medium. If the received signal correlates with the outgoing message, the originating station infers that its transmitter is hot. If the signal does not correlate, the message is repeated and after a predetermined number of "unsuccessful" repetitions, the originator assumes that its transmitter is not at fault.

A station determining that its transmitter is hot, stores a locally displayable indication of its condition and broadcasts a "hot location" message which actuates the other stations on the network to store corresponding indications. The location information is displayed at each location, either continuously or in response to operator prompts, for directing operating personnel and field repair personnel to respectively disconnect the hot transmitter and repair it.

In a preferred embodiment of our invention, locally linked stations, using a CSMA/CD link access protocol, specify their own network addresses as destinations in the abovementioned test messages. Thus, a station having a faulty connection preventing its transmissions from reaching the medium can not erroneously interpret a test message sent from another station with a hot transmitter as locally originated.

Preferably, each station prefaces its attempted transmission of the test message with an attempt to disconnect its transmitter from the medium (e.g. by attempting to open a switch in series with its transmission path). Thus the test message is sent only if the continuity of the transmission path is not controllable by the station's electronic equipment (i.e. only if manual intervention is necessary).

The foregoing and other features, advantages, benefits, objectives and applications of the present invention may be more fully understood and appreciated by considering the following description and claims.

DESCRIPTION OF THE DRAWINGS

FIGS. 4 and 5, respectively, illustrate frame formats of test messages and location identifying messages in accordance with the present invention.

FIGS. 6A and 6B, respectively, illustrate host systems and controller subsystem operations, in accordance with the subject method, in flow diagram form.

FIG. 7 illustrates details of control logic associated with the invention.

DETAILED DESCRIPTION OF THE INVENTION

Figure 1:
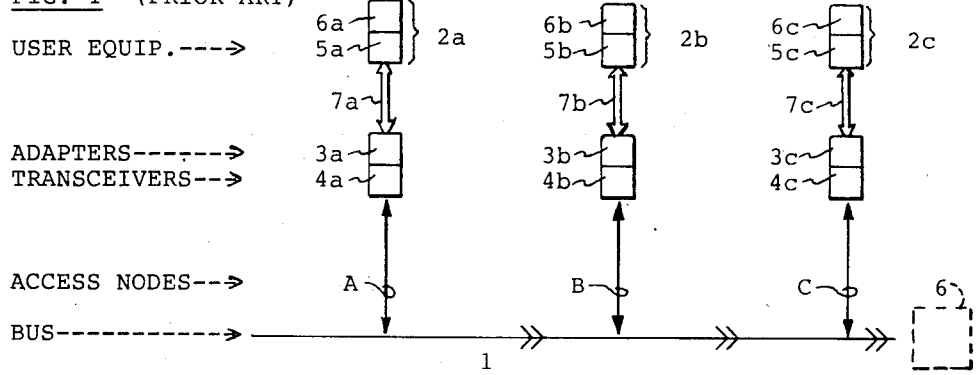
FIG. 1 is a block schematic of an environmental prior art CSMA/CD system in which the hot carrier location method of the present invention can be implemented efficiently.

FIG. 1 shows an environmental prior art system in which the subject method invention can be efficiently implemented. Bus 1 links spatially separated data processing subsystems $2a$, $2b$, $2c$, ..., in a local area data communication network. These subsystems connect to the bus at respective access nodes A, B, C, ..., through respective communication adaptive controllers (hereafter "adapters") $3a$, $3b$, $3c$, ..., and respective transceivers $4a$, $4b$, $4c$, .... The adapters use CSMA/CD protocols, now well known, to distributively control their access to the bus (refer to the above-referenced patents to Metcalfe et al and Hopkins et al).

Each subsystem comprises "user equipment", which may include a respective "host" data processor 5a, 5b, 5c, . . . , with respective application programs and peripheral attachments 6a, 6b, 6c, . . . (printers, diskette drives, etc.). A typical such subsystem could center on an IBM personal computer. Each adapter contains an integral microprocessor discussed later, and conveniently has bit serial linkage to the ("external") bus 1 and byte serial linkage to the respective host processor via a respective separate ("internal") bus 7a, 7b, 7c, . . .

Although the structure of the bus 1 is not considered relevant to the present invention, it is noted for the sake of completeness that it may be either a terminated impedance single channel configuration of the type shown in the Metcalfe et al referenced patent, or a two channel (forward/return) arrangement with a head end transponder of the type shown in the Hopkins et al patent. The subject invention will work the same relative to either configuration.

Similarly, the logical organizations of the host processors and their attachments are not relevant, and with certain exceptions noted later the logical organizations of the adapter microprocessors are not material. However, for the sake of completeness, it is noted that an Intel 8031 microprocessor, with memory capacity of at least 8K bytes, would have adequate capacity and cycle timing for all of the processing operations required to implement the subject invention.

Figure 2:
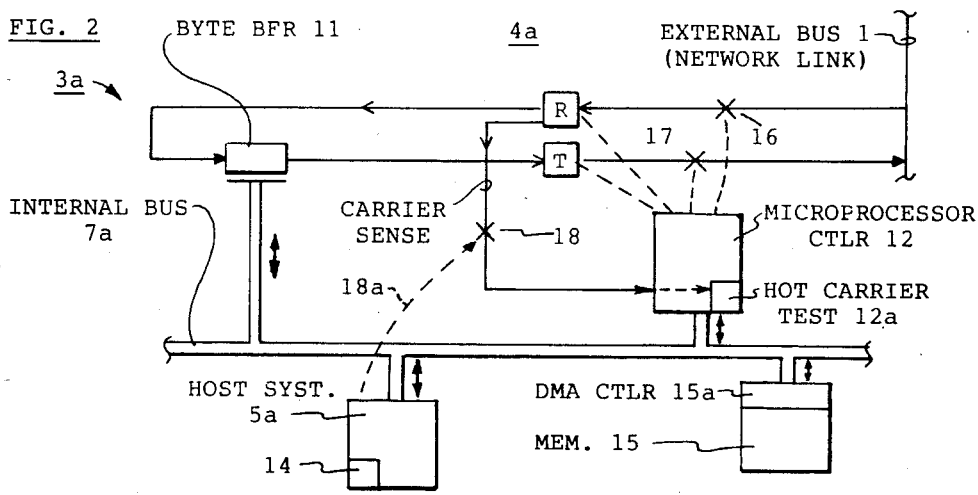
FIG. 2 is a block schematic illustrating the adaptation of a station in the system of FIG. 1 for conducting the present locating test.

FIG. 2 shows the logical organization of adapter 3A at Node A, as typical of all subject adapters. Byte buffer 11, interfacing between transceiver 4a and "internal bus" 7a, operates as a bit serial shifter relative to "external bus" 1, and a bit parallel byte-serial staging point relative to the respective subsystem. The adapter includes a microprocessor controller 12 containing facilities 12a for performing the subject hot carrier location test. The host system 5a includes a central processor 14 and a memory 15, the latter directly accessible through the bus 7a. The memory 15 includes a controller 15a regulating access to it by the central processor, the microprocessor and other local system elements.

Switches 16 and 17, respectively connected between the bus 1 and the receiver and transmitter parts of the transceiver (respectively the parts shown as R and T in the drawing), are normally controllable by the microprocessor 12. Normally closed switch 18, controllable by the host processor, couples a "carrier sense" condition indication from the receiver R to the controller microprocessor which the latter system uses to conditionally control transmission access to bus 1. The switch closed and receiver output active present a "lockout" condition to the controller. If switch 17 should become stuck uncontrollably in a closed (through-connecting) position, the transmitter would be continuously linked to the bus and present a "hot carrier" condition. Conversely, if switch 17 should become stuck in an open position, the local transmitter would be isolated from the bus preventing the local subsystem from communicating in the network.

Figure 3:
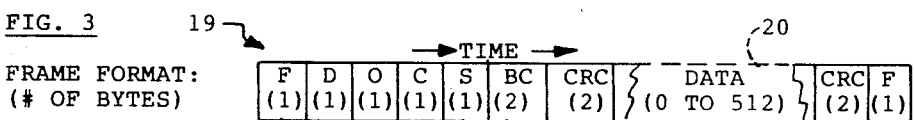
FIG. 3 illustrates the frame format used for message transmittal in the environmental system of FIG. 1.
Figure 3:
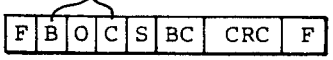
Figure 4:
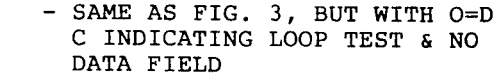

When a hot carrier condition occurs, elements of each system cooperate to sense the condition and attempt to determine its location in the network as either local or at another node. This determination involves attempted transmission of certain formatted test messages to the bus 1, and evaluation of signals received from the bus during such transmissions. The formats of various types of message communications to the bus are illustrated in FIGS. 3-5, and operations involved in carrying out bus communications, including the subject hot carrier locating function, are illustrated in FIGS. 6A and 6B.

In the present system, stations transmit their information in "frames" 19 (FIG. 3) which vary in length from 10 to 544 (8-bit) bytes or "characters". The general frame format is shown in FIG. 3. Each frame starts and ends with flag characters "F", including control information fields D, O, C, S, BC and CRC trailing the start flag (collectively termed the "header"), and may or may not contain a data section 20. The header consists of destination and origin address bytes "D" and "O", a control byte "C", a sequence byte "S", two bytes "BC" representing a byte count defining the data length, and two bytes "CRC" representing a cyclic redundancy check function for verifying correct reception of the preceding bytes of that frame. If the frame contains a data portion, the byte count value will be greater than 0, data will follow after the header CRC and the data will conclude with a two byte CRC field for verifying reception of the data.

As implied by their names, the D and O bytes, respectively, indicate the intended destination and origin of the frame. Frames directed to a single node have the address of that node as their D byte. Frames directed to all nodes, termed "broadcast frames", have a D value denoting this.

The C and S bytes, respectively, indicate the frame type (e.g. "control only" or data) and the "session sequence" of frames containing data. To exchange data, stations operate through a series of control frames to establish a session, and thereafter transfer one or more frames of data distinguished or verifiable by their S values. Such frames are individually acknowledged or signalled as erroneous by the destination station, and the origin station repeats its transmissions of frames signalled as received incorrectly. Thus, the S values distinguish between new frames and repeated frames within a session.

When a hot carrier condition is sensed at any station, that station attempts to transmit a "loop test" message frame having the format shown in FIG. 4. This frame is a control only type frame whose destination and origin bytes are identical. The station sending this message keeps its receiver circuits active and evaluates the signals received contemporaneously from the bus for informational correlation to the outgoing frame.

If the hot carrier is located at another station, the message from the respective station will encounter interference on the bus. However, if the hot carrier is situated at the respective station, the message will pass to the bus and may return through the station's receiving circuits without interference (i.e., correlated with the outgoing information). If the received signal does not correlate with the transmitted message, the station repeats the test transmission, and if correlation is not recognized after a predetermined number of repetitions, the station equipment recognizes that the fault is not local and ceases its tests.

The form of the test message (FIG. 4) is designed to ensure accurate detection of a fault located at the respective station node. The control byte C indicates that the message is a "Loop Test" type message (i.e. a control message specifically used for locating a hot carrier). The message is called Loop Test because it is addressed exclusively to the station which originated it; i.e., its destination and origin address bytes are equal, as shown at 21. Consequently, if the information returns from the bus in a recognizable form, it will correlate only at the originating station and not through error at another station.

This is a preferred alternative to using a broadcast address for this type of message. Consider two or more stations simultaneously attempting test message transfers with a broadcast destination, one of these stations having the "hot" transmitter and another one of these stations having its transmitter stuck in an off condition (so that its transmissions could not reach the bus; i.e., with its switch 17, FIG. 2, stuck in an off position). The message would go out from the hot station and be receivable at both stations. Now if the only criteria for "hot carrier" detection were successful reception of a message, the station with the blocked transmitter could still receive a message and erroneously conclude that it had the hot carrier. However, there is considerably less likelihood of a specifically addressed message being received and misinterpreted at such a station.

If a station determines that its transmitter is hot, it repeatedly broadcasts a "hot carrier located" frame having the form shown in FIG. 5. This frame is distinguished in function by its control byte information C and in its broadcast destination by its D byte 22.

The methods of operation of subject subsystems—both for normal communication and hot carrier location—are shown in FIGS. 6A and 6B, illustrating host processor and adapter/controller actions for sending messages on bus 1.

The host processing system (5a, 15a, 15—FIG. 2) employs the conventional hierarchy of programs (i.e. microprograms, supervisory programs, and application programs) for performing its tasks. In addition to its ordinary processing and I/O operations, these tasks include operations for sending messages to the bus 1 (via the controller subsystem) and operations for processing messages received from the bus and placed in storage by the controller. When outgoing communication to the bus is required the host system performs the operations indicated at 61 (FIG. 6A); including preparation of a message in system memory (15, FIG. 2), and transfer of a command to the controller (12, FIG. 2). In response to the command, the controller subsystem carries out the operations required to gain access to the bus, send the message, if possible, and report status to the host. Host software monitors the status of the commanded function, at least in part in response to information supplied by the controller subsystem via interruptions, and takes further action, if required, when completion status is indicated.

The message transfer operation designated by the above-mentioned command can be in either incomplete or complete status. The status is incomplete until the controller subsystem posts a concluding indication (usually via interruption); which may indicate either successful completion of the transfer to the bus or an error. The host system takes no further action with respect to the message communication task until such a concluding indication is received. If the message has been sent without an error recognizable in either the controller subsystem or the host system (no exit at decision point 62, FIG. 6A), the host system concludes the operation by posting a "good end" indication to the task program which required the communication (action 63, FIG. 6A).

At this point, a distinction should be made between errors in message transfer handling which are normally recognizable by the controller subsystem, and errors which usually would be distinguished by the host system. In general, the controller would be responsible for recognizing errors due to inaccessibility of the bus (e.g. unusual repeated collisions or an excessively long busy period which could be due e.g. to a "hot carrier" condition) or to faulty conditions within the controller/transceiver subsystem, whereas the host system would be responsible for recognizing incorrect handling of the message in transit (e.g. by analysis of information in an "acknowledgement" message sent from a destination station when one has been specified).

If the operation concludes with recognition of an error condition ("yes" exit at decision stage 62), and the error is due to a condition other than a CS (Carrier Sense) timeout ("no" exit at decision 64), the host identifies and posts a specific error condition (action 65) as its concluding action. A CS timeout is raised by the controller when the external bus is busy continuously for more than a predetermined time. If the error is due to a CS timeout, the host performs operations 66, sets a "system retry count" to a specific threshold value and operates through the control path suggested at 18a (FIG. 2) to disable the Carrier Sense input to the controller (e.g. by "opening" switch 18), and thereby permit transmission by the controller/transceiver subsystem (the existence of an active Carrier Sense condition operates to lock out the transmission function). These actions prepare the controller/adapter subsystem to perform the hot carrier location operations described next.

At this point, the host takes actions 67. It prepares a "Loop Test" (LT) message having the form shown in FIG. 4, passes an output/send command to the controller subsystem, and waits for completion of the command operation by the subsystem (as it does after preparing any other message—see action 61—the host software suspends the task entailing the message transfer, although the system may continue to perform other tasks). Upon receipt of concluding status, the host determines if the controller encountered an error (decision 68) and if so determines if the controller has exhausted its retry function (decision 69).

In regard to this retry function, it should be mentioned that the controller listens for collision while sending the message, automatically aborts the transfer if a collision is detected, and conditionally retries each aborted operation (after a delay which it determines) if an associated "controller retry count" has not become exhausted (e.g. decremented to 0 value). These controller actions (which are discussed in more detail with reference to FIG. 6B) are performed "transparent" to the host system (i.e. before concluding status is posted to the host). Accordingly, when unsuccessful concluding status is posted, the controller will indicate either that its retry count has exhausted or that another type of error has been detected.

If exhaustion of the retry count is indicated, the host recognizes that the controller is unable to transmit the LT message because of interference on the bus with a non-local hot carrier. Therefore, the host concludes the operation by posting an "HC Elsewhere" (Hot Carrier Elsewhere) indication (action 70), while reactivating the CS function disabled at step 66. If the controller retry count is not exhausted when the controller posts a non-successful conclusion ("no" exit at decision point 69), the host posts an actual error condition indicated by the controller (action 71) which may instigate further action not relevant to the present invention (e.g. diagnostic testing of the controller subsystem under host direction).

If the host receives a "No Error" indication from the controller at decision stage 68, it examines the information in the frame received by the controller (action 72). This will be discussed further in reference to FIG. 6B, but for the present it should be noted that in the absence of collision, the controller will receive the information in the LT message because the destination address in that message coincides with the local address. If that information correlates with the information sent out ("yes" exit at decision 73), the host recognizes that the hot carrier condition is local and posts a "Hot Carrier Here" indication (action 74). Correlation is established, in this particular instance, if the received information contains equal origin and destination bytes and a CRC function which correlates with a CRC residue calculated from the preceding bytes.

In this circumstance (correlation established), the host loops through action sequence 75, 76 to repeatedly broadcast a "Hot Carrier Located" message, of the form shown in FIG. 5, to all other stations on the bus. This loop terminates when a not shown reset action occurs; i.e. when the local system is taken off line (disconnected from the bus) manually. When this occurs, the local system may be tested and its fault repaired.

If correlation is not established at decision stage 73, the host decrements the system retry count function (action 77) and tests its value (decision 78). Recall that this is the function which the host set earlier at action step 66. If the value is not 0, the host repeats the LT test transmittal action sequence beginning at 67. If the value is 0, the host recognizes that the bus is inaccessible locally, posts a "Hot Carrier Elsewhere" indication and concludes by re-enabling the CS function disabled earlier (action sequence 79).

FIG. 6B indicates the bus transmission functions performed by the controller. When the controller microprocessor receives a send command from the host, it enables a CS (Carrier Sense) timer (actions 90) discussed later. When this timer is enabled and CS is active ("yes" exit at decision 91), a counter portion of this timer counts timed clock pulses until it is either reset or reaches a particular value at which it overflows; overflow instigating the loop test procedure discussed earlier. CS is active when carrier activity is present on the external bus and the host has not disabled the CS function (refer to step 66, FIG. 6A). In this circumstance, the controller loops through decision loop 91, 92 until either CS goes inactive or the timer count overflows.

While this is occurring, the receiver circuits are actively receiving and demodulating the signals present on the bus as indicated in phantom at 93. The information in the demodulated signals is being examined by the controller independent of the sending process, and if a leading flag byte is detected followed by destination information, designating either the local address or a broadcast message, the controller operates to receive a message and store it in system storage.

If a timer overflow is sensed during any traversal of the foregoing decision loop 91, 92, the controller disables the timer and concludes the sending process by posting a "CS Timed Out" indication to the host (actions 94). However, if CS becomes inactive before the timer reaches overflow status, the controller resets and disables the timer and sets a "controller retry" count function to an initial value 5 (actions 95). This retry count function should not be confused with the host system retry function indicated at steps 66 and 77, FIG. 6A. As mentioned above, the controller retries sending operations aborted on collision and does not report error to the host until its retry count is exhausted (decremented to 0). Accordingly, when CS goes inactive, the controller begins to send the message prepared by the host system.

To the controller, this operation is the same whether the message is a Loop Test message or any other message. This is a distinctive aspect of this preferred embodiment of our invention since it permits the loop test function to be conducted through any "intelligent" controller without requiring specific adaptation of the controller, other than the connection permitting the host system to directly control the CS function (see 18a, FIG. 2).

In the sending process (actions 96), the controller/transceiver subsystem passes bytes to the bus (as carrier modulated signals), while listening to the signals on the bus for collision (which, depending on the hardware construction of the subsystem, would be sensed either as phase violation effects or as bit disagreements between outgoing and incoming bits). When the process concludes (i.e. when either all bytes of the message have been sent or sending has aborted due to detection of collision), the controller decrements its retry count as shown at 96.

As suggested in phantom at 97, concurrent with this (sending) process, the subsystem receives the signals appearing on the bus, evaluates the information in the header and, if a flag is sensed, either ignores or stores the following information depending on the destination address (for messages other than LT messages and broadcast messages the destination would be remote and the following information would be ignored, whereas for LT and broadcast type messages the following information would be stored).

At conclusion of the sending process, the controller conditions its next action on whether or not the process had been affected by collision (decision 98). In the absence of collision, the controller concludes by posting a "No Error" indication to the host (action 99). As explained above, this means only that the controller has not detected error; it does not mean that the information received correlates with that sent out. If a collision is indicated at decision 98, the controller conditions its next action on the value of its retry count (decision 100). If the count is not 0, the controller repeats the sending process starting at action 96. If the count is 0, the controller concludes by posting a "Controller Retry Exhausted" indication to the host (action 101).

FIG. 7 illustrates details of key elements in the controller subsystem which allows the host system to sustain the foregoing LT message transmittal and evaluation processes. CS Timer 201 is enabled, by operation of AND gate 202, when the controller has received a Send command and CS is active. The timer then counts internal subsystem clock pulses (CLK) until it either overflows or CS goes inactive; i.e. until OR circuit 203 senses the overflow or receives an output from inverter 204 indicative of CS inactivity.

The CS activity state is indicated to the controller at its input 206. The CS activity signal from Receiver R is gated to input 206 through AND circuit 207 and OR circuit 208 when latch 209 is Set by an "Enable CS"

input from the host system (latch 209 and AND 207 are functionally equivalent to switch 18, FIG. 2, and the "Enable CS" and "Disable CS" connections to that latch are functionally equivalent to control path 18a, FIG. 2). If 206 is active and the controller/transceiver subsystem is not transmitting to the bus, the subsystem is inhibited from starting a transmission. Latch 209 is reset by a "Disable CS" triggering input sent from the host system when an LT message has been prepared (action 66, FIG. 6A). When the latch is reset and the controller subsystem is not transmitting ("Sending Message" control line inactive), AND circuit 210 and OR circuit 208 pass a "pseudo CS Inactive" signal to the controller. This permits the controller to start sending the LT message, even though the receiver CS output is actually then active. When the subsystem begins sending that message control line "Sending Message" becomes active, presenting a CS active signal at 206 which permits the subsystem to receive from the bus while it is sending.

While the invention has been particularly described with reference to the illustrated preferred embodiments, it will be understood that various changes in form and detail may be made thereto without departing from the spirit and scope thereof.

We claim:

1. In a multiple access data communication network, in which plural stations intercommunicate through a common medium, and distributively control their access to the medium by monitoring it for busy and idle carrier activity conditions and enabling their respective transmitters only when the medium appears to be idle, a method for determining the location of a hot carrier condition comprising, at any station sensing a busy condition on said medium:

timing out the period of continued existence of said condition;

terminating said timeout without further action if the condition terminates before a predetermined length of time;

attempting to transmit a predetermined test message if the condition persists for at least said predetermined length of time;

receiving signals from said medium while transmitting said test message and evaluating said signals for correlation with said test message; and establishing either a "hot carrier here" indication or a "hot carrier elsewhere" indication at the respective station depending respectively on whether the received signals do or do not correlate with the test message.

2. A method in accordance with claim 1, for determining the location of a hot carrier condition in a multiple access data communication network comprising:

including predetermined destination address indicia in said test message; and basing said correlation determination on a comparison of said address indicia to signals received while said representations of said address indicia are being transmitted.

3. A method of hot carrier location in accordance with claim 2 comprising:

arranging said address indicia to correspond to an address uniquely assigned to the station respectively attempting said test message transmission.

4. A method in accordance with claim 1 comprising:

selectively repeating said attempted transmission of said test message and said correlation evaluation when said received signals do not correlate with said test message; and terminating said repetition and establishing a "hot carrier elsewhere" indication at the respective station after a predetermined number of repetitions have been attempted, each without correlation to the received signals.

5. A method for hot carrier location in accordance with claim 1 comprising:

at a station establishing a "hot carrier here" indication, preparing a "hot carrier" location message containing information defining the location of the respective station in said network; and transmitting said location message to other stations via said medium.

6. In a multiple access data communication network in which plural stations monitor a common medium for busy and idle activity conditions and independently initiate transmissions of data messages over the medium when it appears to be idle, a method of detecting the location of a hot carrier condition at one of said stations comprising, at each station prepared to transmit a data message when said medium is in a busy condition:

timing out the continued duration of said condition;

terminating the timing out operation and sending said data message if the busy condition terminates before the passage of a predetermined interval of time;

initiating selective repetitive transmission of a test message if said condition persists for at least said predetermined length of time;

receiving signals from said medium during each transmission of said test message, and evaluating said received signals for correlation to said test message;

conditioning each repetition of said test message transmittal on the absence of correlation;

establishing a "hot carrier here" condition indication at said station in the event that said received signals have a predetermined correlation to said transmitted test message; and establishing a "hot carrier elsewhere" condition indication at said station, and halting transmission of said test message after a predetermined number of repeated transmissions of said test message are carried out, each without correlation to received signals.

7. A method of locating a hot carrier condition in accordance with claim 6 comprising:

including in said test message predetermined destination address indicia, and basing said correlation determinations on comparisons of said received signals with said indicia.

8. The method of claim 7 wherein:

said destination address indicia correspond to an address uniquely assigned to the station respectively transmitting the test message.

9. The method of claim 6 including:

at each station establishing a "hot carrier here" condition indication, transmitting a "hot carrier" location message to other stations, said location message containing origin address indicia uniquely identifying the location of the transmitting station in said network.

10. The method of claim 9 wherein:

said locating message is sent in a "broadcast" format making it simultaneously receivable by all other active stations on the network.

11. A method for operating stations linked through a shared bus in a multi-access data communication network to autonomously determine the location of a hot carrier condition appearing on said bus, said stations having transmission controls normally blocking transmission access to said bus when remotely originated carrier activity is present on said bus, comprising:

- timing periods of continuous carrier activity on said bus and developing a timed out indication when such activity has persisted for at least a predetermined period of time;
- preparing a test message in response to said timed out indication;
- overriding said blocking controls upon preparation of said message;
- transmitting said message on said bus;
- receiving signals from the bus while transmitting said test message; and
- determining the station location of said hot carrier condition from the form of said received signals.

12. The method of claim 11 comprising:
- addressing said test message to the station originating the message; and
- determining if said received signals contain the address of the respective station as one criterion for determining if the hot carrier condition is originating at the respective station or elsewhere.

13. The method of claim 11, wherein each station contains primary and secondary processing equipment, the secondary equipment interfacing to the bus under direction of the primary equipment and said access blocking controls, comprising:
- conducting said timing operation step in said secondary equipment;
- preparing said test message in said primary equipment;
- passing a command from said primary equipment to said secondary equipment to instruct said secondary equipment to send said test message; and
- operating through said primary equipment to override the access blocking controls and present a pseudo carrier inactive signal to the secondary equipment; whereby said secondary equipment acts to transfer said test message to said bus even though carrier activity is currently present thereon.

* * * * *